Sept. 17, 1968  J. J. BUNDSCHUH ET AL  3,402,006
MOTION PICTURE PROJECTOR
Original Filed Feb. 23, 1965  2 Sheets-Sheet 1
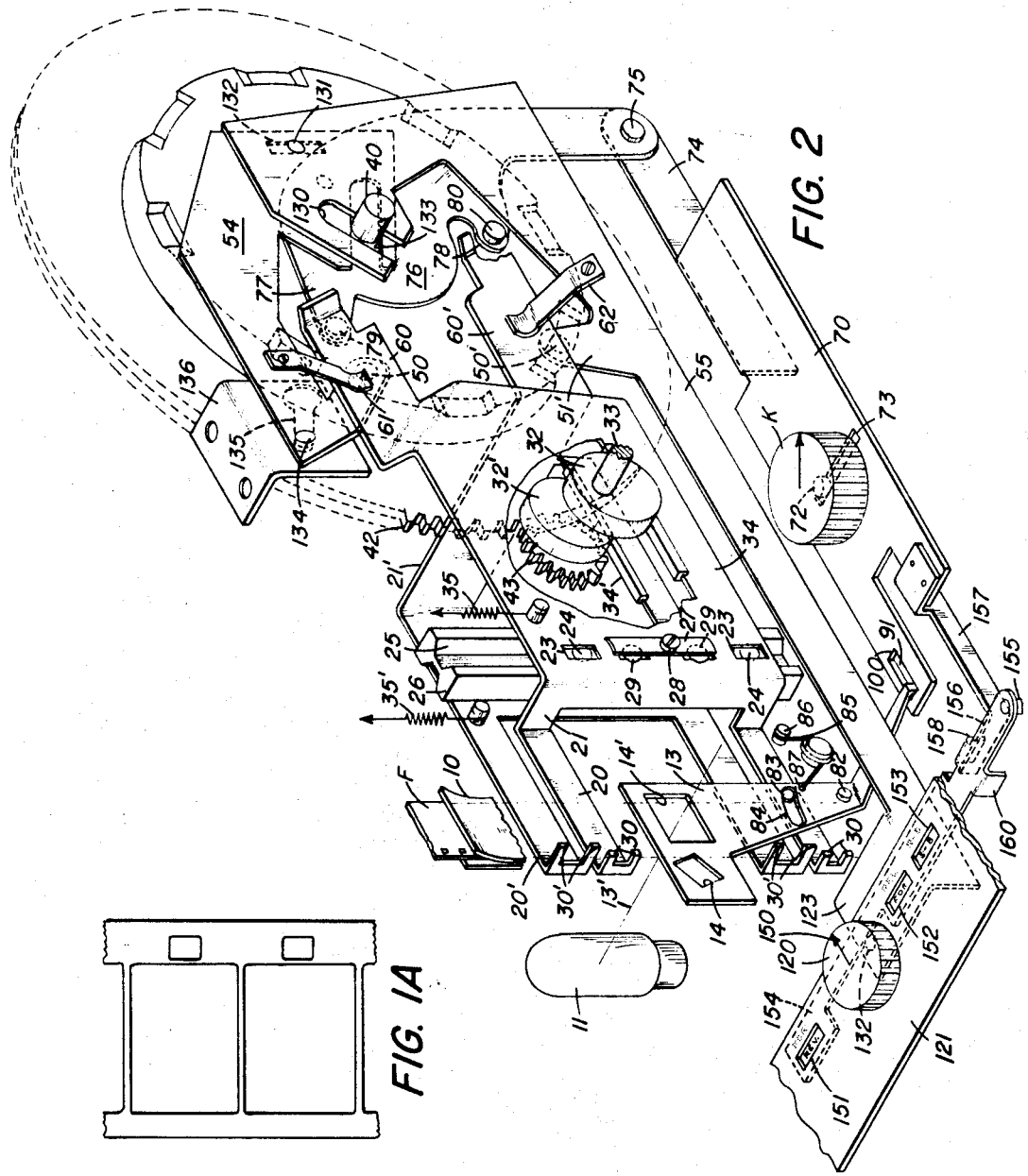
JOHN J. BUNDSCHUH
LEONARD F. KAMP
INVENTORS
BY R. Frank Smith
ATTORNEYS Sept. 17, 1968 J. J. BUNDSCHUH ET AL 3,402,006
MOTION PICTURE PROJECTOR
Original Filed Feb. 23, 1965 2 Sheets-Sheet 2

JOHN J. BUNDSCHUH
LEONARD F. KAMP
INVENTORS

BY *R. Frank Smith*

*Karl J. Kramny*

ATTORNEYS

United States Patent Office 3,402,006
Patented Sept. 17, 1968

3,402,006
MOTION PICTURE PROJECTOR
John J. Bundschuh, Penfield, and Leonard F. Kamp, Rochester, N.Y., assignors to Eastman Kodak Company, Rochester, N.Y., a corporation of New Jersey
Continuation of application Ser. No. 434,494, Feb. 23, 1965. This application July 17, 1967, Ser. No. 654,004
7 Claims. (Cl. 352—79)

ABSTRACT OF THE DISCLOSURE

A motion picture projector for both regular 8 and super 8 motion picture film has a single control for changing the advancing means, which may be one or more film claws, so that it will selectively advance one or the other of the film sizes and simultaneously change the aperture size to correspond to the film size being advanced.

*Cross-reference to related application*

Figure 3:
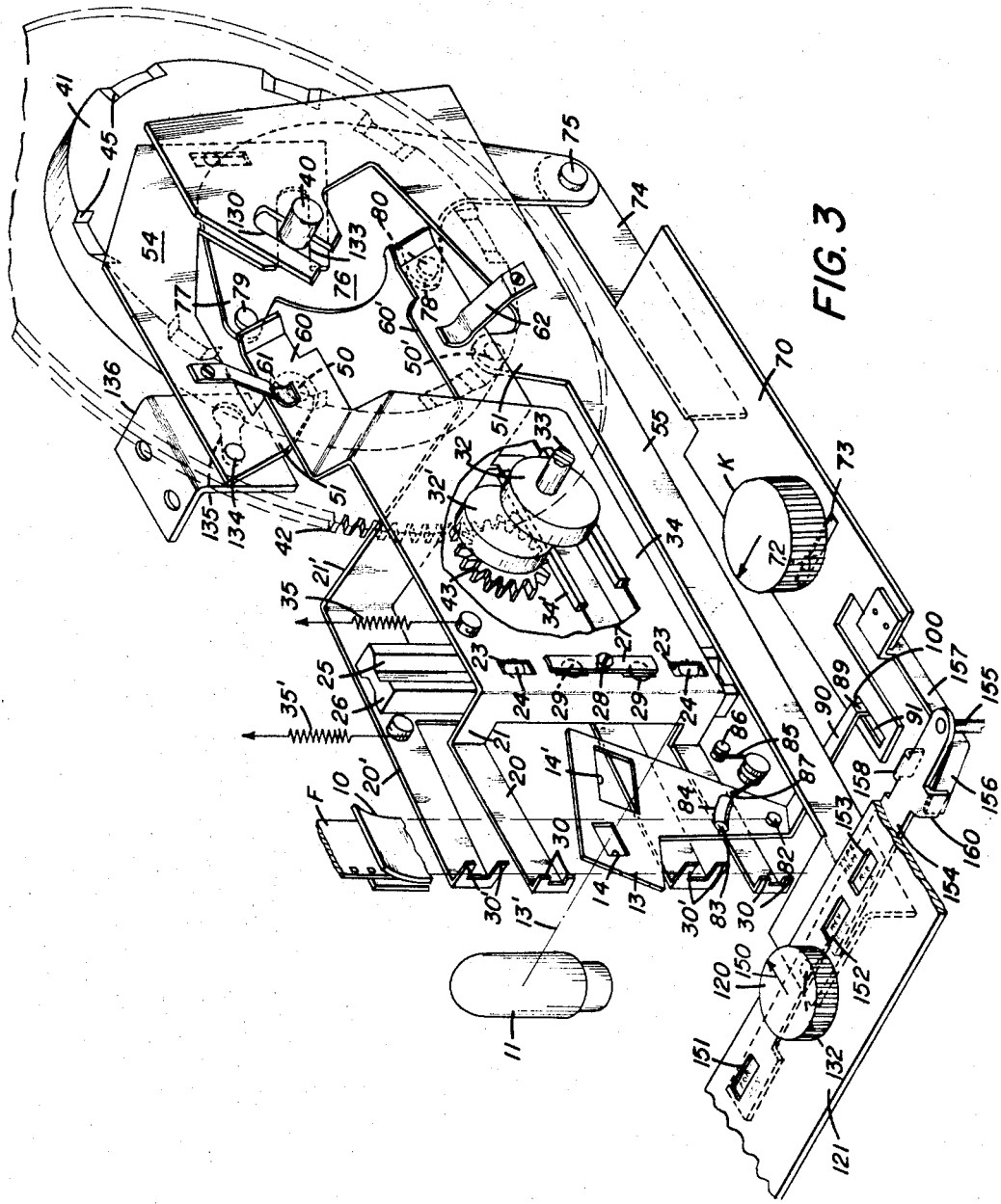

This application is a continuation of copending application Ser. No. 434,494 filed Feb. 23, 1965.

The present invention relates to a motion picture projector, and particularly to a motion picture projector adapted to selectively project one or the other of two types of motion picture film which differ from one another in the size of their picture frames, the pitch of their perforations and the location of the perforations relative to the center of the picture frames.

It is known in the prior art to provide motion picture projectors which are adapted to selectively project different types or sizes of motion picture films, e.g., 16 mm., 8 mm., 9.5 mm., etc. For the most part, such known projectors have included separate film gates or guides for guiding the different types of film past one or the other of two projection beams and have been provided with separate intermittent film feeding mechanisms for each type of film which are selectively used. In other words, these projectors have consisted of little more than an aggregation of a plurality of selectively usable film guiding and feeding means, each one being adapted to handle a given size of film, with the result that they are unduly cumbersome and/or complicated. Other known projectors of this type have included a single film claw having two sets of teeth, each set of teeth being adapted for use with a different size of film, and means have been provided to selectively use one or the other of said sets of teeth depending upon the type of film to be projected, and the stroke of the claw being adjusted to accommodate any difference in perforation pitch there might be between the two types of film. All of these multiple film motion picture projectors have possessed one or more of the following disadvantages: they are cumbersome and complicated by reason of their comprising a duplication of separate film guiding and film feeding mechanisms for each size of film; their adjustment for use with any one type of film has not been capable of adjustment by a control knob whose position of adjustment gives a clear indication of the type of film the projector is set to accommodate; no provision is made for running the film in both a forward and reverse directions and for varying the rate of projection in both directions of operation without having to stop the film feeding means or its prime mover.

The primary object of the present invention is to provide a motion picture projector adapted to selectively project one or the other of two different sizes or format of film, and in which the change necessary to adapt the projector for handling either size of film can be made by the adjustment of a single control knob.

Another object is to provide a two-film projector of the type described in which the speed and/or direction of movement of the film through the projection gate can be made by one and the same control knob irrespective of the size of the film which the projector is adjusted to accommodate.

And still another object is to provide a two-film projector of the type described having two separate variable-rate intermittent film advancing mechanisms and including means for selectively changing the size of the projection aperture to correspond to the two film sizes or format to be accommodated, said parts being so combined that the projection aperture for either size of film can be simultaneously made through the adjustment of a single control knob, and the adjustment of which will in turn be indicated on a control panel of the projector.

And yet another object is to combine two variable-rate film advancing mechanisms in such a way that the same in-and-out cam is used for the film claw of each film advancing mechanism and the pull-down cams of the two claws are 180° out of phase on the shutter shaft so as to provide a balanced drive mechanism.

The novel features that we consider characteristic of our invention are set forth with particularity in the appended claims. The invention itself, however, both as to its organization and its methods of operation, together with additional objectives and advantages thereof will best be understood from the following description when read in connection with the accompanying drawings in which:

FIGS. 1 and 1*a* schematically illustrate the two different sizes of films which the present projector is adapted to selectively handle FIG. 1 shows the standard 8 mm. film generally used in the trade, while FIG. 1*a* shows a new super 8 mm. film which has been proposed. Both of these films are illustrated on the same enlarged scale and are intended merely to illustrate the relative differences in certain dimensions thereof;

FIG. 2 is a perspective view of a motion picture projector constructed in accordance with a preferred embodiment of the present invention and with the parts shown in the position they will assume when the projector is adjusted to handle the super 8 mm. film shown in FIG. 1*a*; and FIG. 3 is a perspective view of the projector showing the parts in the position they assume when the projector is adjusted to handle a regular 8 mm. film as shown in FIG. 1.

The two different sizes of film which the present projector is adapted to selectively project have the same overall width (present 8 mm.) but differ in the size and format of the image area, the size of the perforations, and the relative location of the perforations and the image areas as well as the pitch of the film perforations.

In order to improve the picture quality of 8 mm. films a new super 8 frame format has been proposed which increases the film area used by the image from the present 47 to 63 percent. This new format would be 211 mils wide by 158 mils high as compared by to the 172 x 129 mils of the present 8 mm. format. As shown in FIGS. 1 and 1*a*, this increase in picture area is accomplished by reducing the width of the perforations from 52 to 36 mils. The perforations would be placed as close as possible to the edge of the film, though a twenty mil margin would probably be needed to resist edge pressure, wear, and breaks at the perforation corners. Also in the new format each perforation is opposite the center of one of the picture frames instead of at the frame line therebetween so that splices will not pass through the perforation. The perforation pitch of the super 8 film will be approximately 166.7 mils as compared with 150 mils for the present 8 mm. film. It will thus be seen that while the overall width of these two sizes of films is the same so that they can be guided through the same film gate past the projection beam, because of the difference in location of the line of perforations relative to the optical axis of the projector gate and the difference in the perforation pitch the two films will require separate film-feeding claws. Likewise, because the areas of the image areas of the two films differ, the size of the projection aperture of the gate must be changed to correspond with the particular size of film being used.

While as an illustrative embodiment of our invention we have shown and will describe the two film pull-down mechanisms of our projector as each being of the skip-rate type it will be readily understood that the invention is not limited to this particular type of intermittent pull-down mechanism but could use two or more of any type of pull-down mechanisms so long as their operation of advancing film can be selectively rendered operative and inoperative. Also, since we have shown the size of the projection aperture as being varied by the selective use of two masks of appropriate size, it should be understood that any means of selectively changing the size of the projection aperture could be used without going beyond the scope of the present invention.

Referring now to the drawings, for purposes of clarity and simplification we have shown only those parts of a motion picture projector which are essential to an understanding of the present invention. These parts include an aperture gate, indicated at 10, for selectively guiding the two different films in a vertical film plane and across the optical axis of the projector where the image frames are illuminated by a lamp 11 located behind the gate. As is well known, the optics of the projector will include, among other things, a condenser lens between the lamp and the gate and a projection lens in front of the gate to project the illuminated images onto some suitable viewing surface, but since these components of a projector are well known they have not been shown. Whereas in conventional projectors adapted to use only a single size of film the aperture in the gate is the projection aperture and corresponds in size to the image areas of the film, in the present projector the gate aperture is merely to allow light to pass through the film and is as large or slightly larger than the image area of the super 8 film to be used in the projector.

In this projector the projection aperture must be changed in size to correspond with the different size of image area of the two different films to be used. To this end, the present projector includes an aperture plate 13 having two different projection apertures 14 and 14' which can be selectively moved into operative position, as will be fully described hereinafter depending on which size of film is to be projected. This aperture plate is positioned immediately adjacent the film gate so that as the projection apertures are moved into operative position they will serve to mask the image areas of the different films as they are intermittently positioned in alignment therewith by the operative one of the two pull-down mechanisms. Since in the present instance both films to be used have the same overall width, the one gate will serve to guide both of the films past the projection aperture. Since the different films require separate pull-down claws located at different distances laterally of the optical axis of the projector and having a different pull-down stroke, the gate must be provided with two sets of elongated slots, not shown, to allow each of the pull-down claws to enter a film perforation at the beginning of a pull-down stroke and to remain in engagement with the film during the pull-down stroke.

Each of the two film pull-down mechanisms is shown to be of the skip-rate variety and combined in such a way that one in-and-out cam will serve to selectively operate both pull-down claws as will now be described. The film pull-down mechanisms for the two films comprise the rigid claw arm 20 for the standard 8 mm. film and a second rigid claw arm 20' for the super 8 mm. film, each of the claw arms extending laterally of the film to be fed and having an offset portion 21 and 21', respectively, intermediate its two ends. Each claw arm is positioned to move up and down and pivot relative to the film plane in the same manner so that mounting of only claw arm 20 will be described. Claw arm 20 has a pair of vertical slots 23 which seat on ball bearings 24 resting in a vertical ball race 25 formed in the forward side of a post 26 fixed to, and forming a part of, the projector housing, not shown. The claw arm is held in assembled relation with the ball bearings 24 by a leaf spring member 27 fastened to the vertical post 26, by a screw 28 extending through an elongated slot in the claw arm 20, said spring member pressing downwardly upon another pair of bearings 29 riding in elongated slots in the claw arm. This type of claw mounting provides for a fairly frictionless vertical as well as a pivotal movement of the arm about the line of the balls, and the inner face of the spring 27 may be arcuate, as shown, to facilitate this movement.

Each claw arm has two pairs of teeth on one end thereof arranged in spaced relation to engage successive film perforations above and below the projection aperture. The claw arm 20' has two pairs of teeth 30' and claw arm 20 has two pairs of teeth 30. As will be readily understood, the teeth 30' of each pair are spaced apart to engage successive perforations in the super 8 mm. film and the pairs are spaced apart so that as one pair engages two successive perforations in the film at a point above the projection aperture the other pair will engage another pair of successive film perforations below the projection aperture. The same dimensional conditions will exist for the teeth 30 on claw arm 20 to adapt them for feeding standard 8 mm. film. Since the row of perforations in the super 8 film are more remote from the optical axis of the projector, see FIGS. 1 and 1a, it follows that the teeth 30' on claw arm 20' will lie outside the teeth 30 on claw arm 20 so that the two claw arms can reciprocate up and down at the same time without interference. To permit this independent movement of the two claw arms, those portions of claw arm 20' extending transversely of the optical axis of the projector are spaced slightly behind the corresponding parts of the claw arm 20, and claw teeth 30' are longer than claw teeth 30 to permit them to move into engagement with the super 8 film when it is located in the gate.

The up and down reciprocal movement of the claw arms 20 and 20' is under the control of separate pull-down cams 32 and 32' fixed to the drive shaft 33 which is adapted to be driven by an electric motor, not shown. The cam 32 engages a follower surface 34 carried by the claw arm 20 and extending at right angles to the vertical ball race 25, while cam 32' engages a similar follower surface 34' carried by the claw arm 20'. Tension springs 35 and 35' connected at one end to claw arms 20 and 20', respectively, and at the other end to a part of the projector housing, not shown, act to lift the claws and hold their respective follower surfaces 34 and 34' against pull-down cams 32 and 32'. It will thus be seen that the cams 32 and 32' drive their respective claw arms downwardly to advance the film whereas the springs 35 and 35' raise the claw arms as followed by the cams 32 and 32'. As a result, each revolution of pull-down cams 32 and 32' produces one complete reciprocal stroke of the claw arms associated therewith so as to advance the film one frame relative to the projection aperture. Should it be desired that this projector drive the films in a reverse direction as well as a forward direction, then it would be desirable to provide follower surfaces opposing follower surfaces 34 and 34' so that the cams will drive the claw arms upwardly, as well as downwardly, instead of having to rely upon springs 35 and 35' for this purpose.

It is particularly noted that the two pull-down cams 32 and 32' are oriented 180° out of phase relative to one another on the drive shaft 33. This arrangement of the pull-down cams serves to balance the drive shaft 33 so that it will not tend to whip as it is rotated at high speeds, e.g., 54 r.p.s. In this way the bearings for the shaft last longer and vibration in the projector housing is reduced to a minimum. By virtue of this out of phase relationship between the pull-down cams it will be appreciated that as the one claw arm is moving downwardly, the other is moving upwardly, or their reciprocal movements are 180° out of phase. This arrangement also tends to balance the entire film driving mechanism and reduce vibration which might result in the two claw arms moved in the same sense during operation of the projector.

The in-and-out movements of the teeth of the two claw arms relative to the film gate is produced by a skip-stroke mechanism which is not specifically a significant part of the present invention except insofar as the part must be so arranged as to allow for an adjustment of the in-and-out followers for the individual claw arms radially relative to one and the same in-and-out cam. So far as the present invention is concerned, it is the manner in which the two claw arms are combined to the selectively operated by one and the same in-and-out cam which is significant and this will now be described.

Fixed to a shaft 40 rotatably mounted in the projector housing, not shown, and in substantially parallel relation with the drive shaft 33, is a wheel or face cam 41 fixed to or carrying a gear 42. Gear 42 is driven by a pinion 43 which is rotatably and slideably mounted on the drive shaft 33 and is selectively clutched thereto in a manner not shown. The shutter, not shown, is also fixed to this pinion 43 to rotate therewith.

The forwardly directed face of the in-and-out cam 41 is provided with a plurality of arcuate depressions 45 which are spaced circumferentially about the face of the cam and have their leading and trail edges tapered into the surface of the cam so that a follower resting against the face of the cam can move into and out of the depressions as the cam rotates. These depressions, therefore, constitute cam surfaces which in combination with the face of the cam form a series of concentric in-and-out cam surfaces whose profiles control the in-an-out movements of the two claw arms. By properly choosing the number of depressions and varying the width of certain ones thereof radially of the face cam and choosing the proper gear ratio between the pinion 43 and gear 42, the profiles of the different concentric in-and-out cam surfaces formed on the cam face will produce a different rate of in-and-out movement of the claw as a result of which the rate of pull down for the claw can be readily altered by merely adjusting the in-and-out followers of the claws radially of the in-and-out cam. So far as the present invention is concerned, the change of rate of pull down is not significant per se, but it is only significant that the claw arms be so mounted that they can be selectively conected to the in-and-out cam and the in-and-out follower associated therewith can be adjusted radially of the in-and-out cam if it is desired to change the rate of projection. For this reason, we will not describe the make up of the in-and-out cam 41 and the speed at which it is driven relative to drive shaft 33, but will confine the present disclosure to how the in-and-out follower for each of the claw arms can be shifted radially of the in-and-out cam and be selectively rendered operative and inoperative.

The in-and-out followers 50 and 50' for the two claw arms 20 and 20' are mounted about 40° apart circumferentially of the face of the in-and-out cam 41. The followers 50 and 50' may be balls or plastic studs which are respectively captured in seats or apertures in arms 51 and 51' carried by lever 54 and speed adjusting lever 55, respectively, so as to be free to move in the seats or apertures axially of the in-and-out cam but captured to be moved radially of the cam as the arms 51 and 51' are so moved. The end 60 of claw arm 20 remote from the claw teeth 30 is pressed into engagement with follower 50 by leaf spring 61 fixed at one end to lever 54. The end 60' of claw arm 20' remote from the claw teeth 30' is pressed into engagement with follower 50' by leaf spring 62 fixed at one end to the speed adjusting lever 55. These leaf springs normally act to pivot the claw arms about the post 26 in a direction to move the claw teeth into engagement with the film in the gate when the followers 50 and 50' drop into the recesses 45 in the face of the cam 41. As the followers move out of these recesses and up onto the face of the cam 41 the action of the leaf springs is overcome and the claw arms are pivoted about post 26 in a direction such as to move the teeth thereon out of engagement with the film in the gate.

In order to adjust the projector for super 8 film the end 60 of the claw arm 20 is raised from, and held out of, engagement with its in-and-out follower 50 so that the claw teeth 30 thereon will not move into engagement with the film in the gate. At this time the claw teeth 30' on the claw arm 20' will drive a super 8 mm. film through the gate and the claw teeth 30 will merely reciprocate without entering the film plane, see FIG. 2. When the projector is adjusted for regular 8 mm. film the claw arm 20 is rendered operative and the claw arm 20' is rendered inoperative, see FIG. 3.

For adjusting the projector to handle one or the other of the two types of film, the following mechanism is provided: a film selector lever 70 is slideably mounted on the projector housing, not shown, to move transversely of the optical axis between the two positions shown in FIGS. 2 and 3, one position, see FIG. 3, adjusting the mechanism for handling the regular 8 mm. film and the other position, see FIG. 2, setting the mechanism to handle the super 8 film. This film selector lever 70 is moved between its two positions by rotation of a film selector knob K having an eccentric pin 72 engaging a slot 73 extending transversely of the lever. The lever 70 has an arm 74 which is turned down therefrom to lie in a plane substantially at right angles to the plane of the lever. Pivotally connected at 75 to the end of arm 74 is a toggle plate 76 pivoted on the shaft 40 of the in-and-out cam. Toggle plate 76 has two spaced arms 77 and 78 fixed thereto, one carrying button 79 and the other button 80. When the film selector knob K is rotated to the position shown in FIG. 2 for adjusting the mechanism to handle super 8 film, the toggle plate 76 is rotated counterclockwise about shaft 40 to move button 79 under the end 60 of claw arm 20 and lift it off its follower 50 so that the claw teeth 30 will be held out of the film plane and will thus be rendered inoperative. At the same time button 80 is removed from under the end 60' of the claw arm 20' to allow its leaf spring 62 to move it into engagement with its follower 50' and thereby render claw arm 20' operative. In the other position of the film selector knob, see FIG. 3, the position of the buttons 79 and 80 are reversed so that claw arm 20' is rendered inoperative and claw arm 20 is rendered operative. To permit ready movement of the buttons 79 and 80 into engagement with the ends 60 and 60' of claw arms 20 and 20', respectively, the ends of the arms are bent up at an angle to the plane of movement to the buttons as shown.

As mentioned before, the aperture plate 13 contains two different projection apertures 14 and 14', corresponding to the image size of regular 8 mm. film and super 8 film, respectively, which are selectively moved into and out of operative position on the optical axis of the projector as the device is adjusted to handle different ones of the two film types. The aperture plate 13 is pivoted on a stub shaft 82 to move between the two positions shown in FIGS. 2 and 3, said positions being determined by the engagement between a fixed pin 83 with one end or the other of an arcuate slot 84 in the aperture plate. A coiled spring 85 fixed at one end to a stud 86 on the projector and at the other end 87 to the aperture plate normally urges the aperture plate to one of its two positions, in the instance illustrated, to the position where projection aperture 14' corresponding to the image size of super 8 film is in the operative position. The turned-down end 89 of the arm 90 extending at right angles from the aperture plate 13 engages a slot 91 in the film selector lever 70. When the film selector lever 70 is adjusted by knob K for super 8 film, see FIG. 2, the slot 91 is positioned to allow coil spring 85 to pivot the aperture plate 13 in a counterclockwise direction by an amount determined by the engagement of the pin 83 with the right-hand end of slot 84 so as to position the projection aperture 14' in its operative position. When the film selector lever 70 is adjusted by knob K for regular 8 mm. film, see FIG. 3, the end 100 of slot 91 is moved into engagement with the turned down end 89 of arm 90 and the aperture plate 13 is moved clockwise against the action of spring 85 until the other end of slot 84 engages pin 83 to locate projection aperture 14 in its operative position. While in the arrangement shown there is no need for the turned-down end 89 of arm 90 engaging the left end of slot 91 in film selector lever 70 or for the left-hand end of arcuate slot 84 in the aperture plate 13, such an arrangement of parts would be required if coiled spring 85 were replaced with a toggle or over-center spring which would snap the aperture plate between its two extreme positions at the time the aperture plate is moved by the film selector lever 70 past positions in both directions in which the toggle spring would be moved past a dead center position. In such a case the film selector lever 70 would have to move the aperture plate in the two directions and both ends of the arcuate slot 84 would have to engage pin 83 to limit the movement of the aperture plate under the action of the toggle spring.

The speed or rate of projection for the selected film claw is accomplished by rotation of a speed knob 120 located on a control panel 121 whose eccentric pin 132 engages a slot, not shown, in arm 123 fixed to and extending substantially at right angles to speed lever 55 to shift lever 55 laterally of the projector and move the ball followers 50 and 50' radially of the in-and-out cam 41. The present description will be limited to the new arrangement of parts which permits one speed control knob to properly adjust either of the two film feeding mechanisms, as well as to a novel arrangement of parts which allows the operator by looking at a single control panel to determine which type of film the projector is adapted to handle, what direction of operation it is set for, as well as what speed operation the selected film feeding mechanism is set to operate at.

As speed changing knob 120 is rotated the follower 50' for claw arm 20' which is carried by arm 51' on speed adjusting lever 55 is shifted radially of the in-and-out cam 41 by virtue of the slot 130 in the lever 55 engaging the shaft 40 of the in-and-out cam being radially disposed relative to the face cam. At the same time, pin 131 fixed to the speed changing lever 55 engages the vertical slot 132 in the lever 54. Follower 50 located by lever 54 also moves radially of the in-and-out cam 41 because lever 54 is guided by slot 133 therein engaging cam shaft 40 and pin 134 carried by lever 54 which engages a slot 135 in a bracket 136 fixed to the projector housing, not shown. It will be observed that both the slots 133 and 134 extend radially of the in-and-out cam 41. Accordingly, whenever the film speed knob 120 is rotated, followers 50 and 50', which are located 40° apart, travel in a radial line with respect to the face of the in-and-out cam 41.

The control panel of the projector comprises the fixed control plate 121 on which the speed control knob 120 is rotatably mounted and includes a speed dial, not shown, with which an index arrow 150 on the knob cooperates to indicate what speed the projector is adjusted for. To the left of the speed knob the control plate 121 is provided with a window 151 and to the right of the control knob the control plate is provided with two windows 152 and 153. A film type and direction plate 154 pivoted at one end on shaft 155 carries two sets of directional data REV and FOR cooperating with windows 151 and 152 and film type data R–8 and S–8 cooperating with window 153. When the film selector knob K is rotated to the position shown in FIG. 2 for adjusting the projector for super 8 film, the turned-over end 156 on the end of spring 157 fixed to the end of film type selecting lever 70 engages a turned-down lug 158 on the plate 154 and rotates said plate clockwise about its pivot 155 to the position shown wherein film type designation S–8 appears in window 153, FOR appears in window 152 and REV appears in window 151. This shows that the projector is adjusted for super 8 film and that the speed control knob 120 should be adjusted to the right of its center position for forward operation and to the left of center for reverse operation. When the film selector knob K is turned to its other position, see FIG. 3, the end 156 of spring 157 engages the turned-down lug 160 on plate 154 and pivots the plate counterclockwise about its pivot 155 to the position shown in FIG. 3 and in which position the film type R–8 appears in window 153, REV appears in window 152, and FOR appears in window 151. The reason why the forward and reverse indicator for speed knob 120 changes when the film type is altered is that the up-and-down cams 32 and 32' are out of phase by 180° while the in-and-out followers 50 and 50' engaging the in-and-out cam 41 are in phase. The manner in which rotation of speed change knob 20 on either side of its center position changes the direction of the film movement forms no part of the present invention it has not been described herein. It will suffice to say here that speed knob 120 has a cam fixed thereto which when the knob is adjusted to one side of its mid-point of adjustment will shift and hold the drive mechanism for the film pull-down claws in a position to drive the film upward instead of downward or in reverse through the gate, whereas when the speed knob is adjusted to the other side of its mid-point, it adjusts the drive mechanism to drive the film forward or downward through the gate. In its mid position the speed knob 120 adjusts the film drive mechanism for the projection of stills all as described in the noted co-pending application to which reference is made for a full description of such operation.

The invention has been described in detail with particular reference to the preferred embodiments thereof, but it will be understood that variations and modifications can be effected within the spirit and scope of the invention as described hereinabove and as defined in the appended claims.

We claim:

1. In a motion picture projector having a film plane and a projection aperture and adapted for selective use with two different sizes of longitudinally perforated films which differ from each other as to size of image frame, lateral position of the perforations and perforation pitch, the combination comprising:

means for guiding each size of film through said film plane and past said projection aperture for the projection of successive image frames thereon;

means for selectively changing the size of said projection aperture to correspond with the size of the image frame on said two sizes of film;

a first intermittently driven film claw for intermittently advancing one size of said films through said film plane for projection of the images thereon and movable between an operative and an inoperative position;

a second intermittently driven film claw for intermittently advancing the other size of said films through said film plane for projection of the images thereon and movable between an operative and inoperative position;

means for selectively moving one of said film claws to said operative position and for moving the other of said film claws to said inoperative position to correspond with the size of film to be projected; and means responsive to said moving means for operating said aperture size changing means to change the size of said projection aperture to correspond with the size of film to which the film claw rendered selectively operative relates.

2. In a motion picture projector having a film plane and a projection aperture and adapted for selective use with two different sizes of longitudinally perforated films which differ from each other as to size of image frame, lateral position of the perforations and perforation pitch, the combination comprising:

means for guiding each size of film through said film plane and past said projection aperture for the projection of successive image frames thereon;

means for selectively changing the size of said projection aperture to correspond with the size of the image frames on said two sizes of film;

a first intermittently driven film claw for intermittently advancing one size of said films through said film plane for projection of the images thereon and movable between an operative and inoperative position;

a second intermittently driven film claw for intermittently advancing the other size of said films through said film plane for projection of the images thereon and movable between an operative and inoperative position;

means for selectively moving one of said film claws to said operative position and for moving the other of said film claws to said inoperative position to correspond with the size of film is to be projected; and a single control member movable between first and second positions corresponding to different ones of said film sizes and connected to said aperture size changing means and connected to said moving means to simultaneously adjust the size of said projection aperture and move said film claw corresponding to the other one of said two sizes of film to said operative position as said single control member is moved from said first position to said second position.

3. In a motion-picture projector having a film plane and a projection aperture and adapted for selective use with two different sizes of longitudinally perforated film which differ from each other as to size of image frame and perforation pitch, the combination comprising:

means for guiding each size of film through said film plane and past said projection aperture for the projection of successive image frames thereon;

means for selectively changing the size of said projection aperture to correspond with the size of the image frames on said two sizes of film;

a first film claw for advancing one of said films;

a second film claw for advancing the other of said films;

means for mounting each of said claws for in and out and up and down movement relative to said film plane during which movements said claws intermittently engage and advance their respective films along said film plane;

means for driving each of said claws up and down and in and out relative to said film plane to intermittently advance said films and including:

a separate up-and-down cam for each claw, each of which provides a stroke corresponding to the perforation pitch of a different one of said films;

means for selectively and alternately rendering each of said claws operative and inoperative and including:

a control member movable between two positions, each of which corresponds to a different one of said films; and means connecting said control member and said aperture size changing means for changing the size of said projection aperture simultaneously to correspond with the claw which is moved to an operative position.

4. A motion-picture projector according to claim 3, in which the means for driving said claws in and out relative to said film plane includes:

a single in-and-out cam rotatable in synchronism with said up-and-down cams;

a cam follower associated with each claw and engageable with said in-and-out cam to cause said claws to move into and out of engagement with said film in response to rotation of said cam; and in which said means for selectively and alternatively rendering each of said claws operative and inoperative includes:

means for selectively and alternatively moving and holding one of said cam followers out of engagement with said in-and-out cam while at the same time moving and holding the other cam follower in engagement with said in-and-out cam.

5. A motion picture projector according to claim 4 in which said aperture size changing means comprises:

an aperture plate having two different sized projection apertures in side-by-side relation, one of said projector apertures corresponding to the image frames of one of said films and the other projector aperture corresponding to the image frames of the other film; and means for mounting said aperture plate so that it is movable relative to said film plane between two positions in each of which a different one of said projection apertures is in masking relation to the film moving through said film plane.

6. A motion picture projector according to claim 3, in which said means for driving both of said claws up and down includes a single drive shaft, and in which said separate up-and-down cams are fixed to said drive shaft in spaced relation axially thereof and oriented 180° out of phase relative to one another to balance said shaft.

7. A motion picture projector according to claim 3, including means for indicating the type of film which the projector is adapted to use at any time and comprising:

a fixed indexing scale;

an indicator movable between two positions relative to said fixed index scale and in each of which positions they cooperate to designate a different size of film which the projector is adapted to accommodate; and means for moving said indicator between its two positions in response to movement of said control member between its two positions to cause said indicator in cooperation with said scale to properly designate the size of film which the projector is adapted to use at any time.

References Cited

UNITED STATES PATENTS

| 2,007,018 | 7/1935 | LaPorte | 352—80 |
| 2,061,879 | 11/1936 | Paillard | 352—80 |
| 2,186,443 | 1/1940 | Becker et al. | 352—80 |
| 2,601,181 | 6/1952 | Thevenaz | 352—59 |
| 2,834,249 | 5/1958 | May | 352—194 |

FOREIGN PATENTS

| 904,036 | 2/1945 | France. |
| 449,137 | 6/1936 | Great Britain. |

JULIA E. COINER, *Primary Examiner.*